United States Patent
Yao et al.

(10) Patent No.: US 7,522,383 B2
(45) Date of Patent: Apr. 21, 2009

(54) SYSTEM AND METHOD FOR DAMAGE PREVENTION BY IMPROVING THE SHOCK RESISTANCE OF A HARD DISK ACTUATOR ARM

(75) Inventors: Minggao Yao, Dongguan (CN); Masashi Shiraishi, Kowloon (HK); Yiru Xie, Dongguan (CN)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 9 days.

(21) Appl. No.: 11/510,472

(22) Filed: Aug. 24, 2006

(65) Prior Publication Data

US 2006/0291103 A1    Dec. 28, 2006

Related U.S. Application Data

(62) Division of application No. 10/289,908, filed on Nov. 6, 2002, now Pat. No. 7,142,396.

(30) Foreign Application Priority Data

Jun. 5, 2002    (WO) .................... PCT/CN02/00391

(51) Int. Cl.
    *G11B 17/00* (2006.01)
(52) U.S. Cl. .................................. 360/255; 360/97.01
(58) Field of Classification Search ............... 360/255, 360/264.1, 265.2, 265.6, 97.01
    See application file for complete search history.

(56) References Cited

U.S. PATENT DOCUMENTS

| | | | |
|---|---|---|---|
| 4,945,435 A * | 7/1990 | Boigenzahn et al. ..... | 360/265.2 |
| 5,239,431 A | 8/1993 | Day et al. ............... | 360/98.08 |
| 5,583,721 A * | 12/1996 | Kim ....................... | 360/97.01 |
| 5,640,290 A | 6/1997 | Khanna et al. ............ | 360/105 |
| 5,754,372 A * | 5/1998 | Ramsdell et al. ......... | 360/265.6 |
| 5,847,902 A | 12/1998 | Clifford, Jr. et al. ......... | 360/104 |
| 5,864,441 A * | 1/1999 | Coffey et al. ............ | 360/97.01 |
| 5,870,252 A | 2/1999 | Hanrahan .................. | 360/104 |
| 6,205,004 B1 * | 3/2001 | Kim ....................... | 360/264.1 |
| 6,301,073 B1 | 10/2001 | Gillis et al. .............. | 360/97.01 |
| 6,341,051 B2 | 1/2002 | Hachiya et al. .......... | 360/265.1 |
| 6,373,666 B2 | 4/2002 | Iida et al. ................. | 360/254.7 |
| 6,417,991 B1 | 7/2002 | Onda ........................ | 360/128 |
| 6,473,270 B1 | 10/2002 | McDonald et al. ........ | 360/265.1 |
| 6,781,791 B1 | 8/2004 | Griffin et al. ................. | 360/128 |
| 6,801,386 B1 * | 10/2004 | Niroot et al. ............. | 360/97.01 |
| 6,956,723 B2 | 10/2005 | Suzuki ....................... | 360/255 |

FOREIGN PATENT DOCUMENTS

| | | |
|---|---|---|
| JP | 03-168985 | 7/1991 |
| JP | 2001-035131 | 2/2001 |
| JP | 2001-067856 | 3/2001 |
| JP | 2001-176257 | 6/2001 |

* cited by examiner

*Primary Examiner*—Angel A. Castro
(74) *Attorney, Agent, or Firm*—Kenyon & Kenyon LLP

(57) ABSTRACT

A system and method are disclosed for improving the vibration/mechanical shock-resistance of a hard disk actuator arm. A guide block is located behind the actuator arm's angular range of motion, preventing over-flexure/vibration during operation, and/or the drive's actuator screw head diameter is increased to minimize arm vibration.

8 Claims, 5 Drawing Sheets

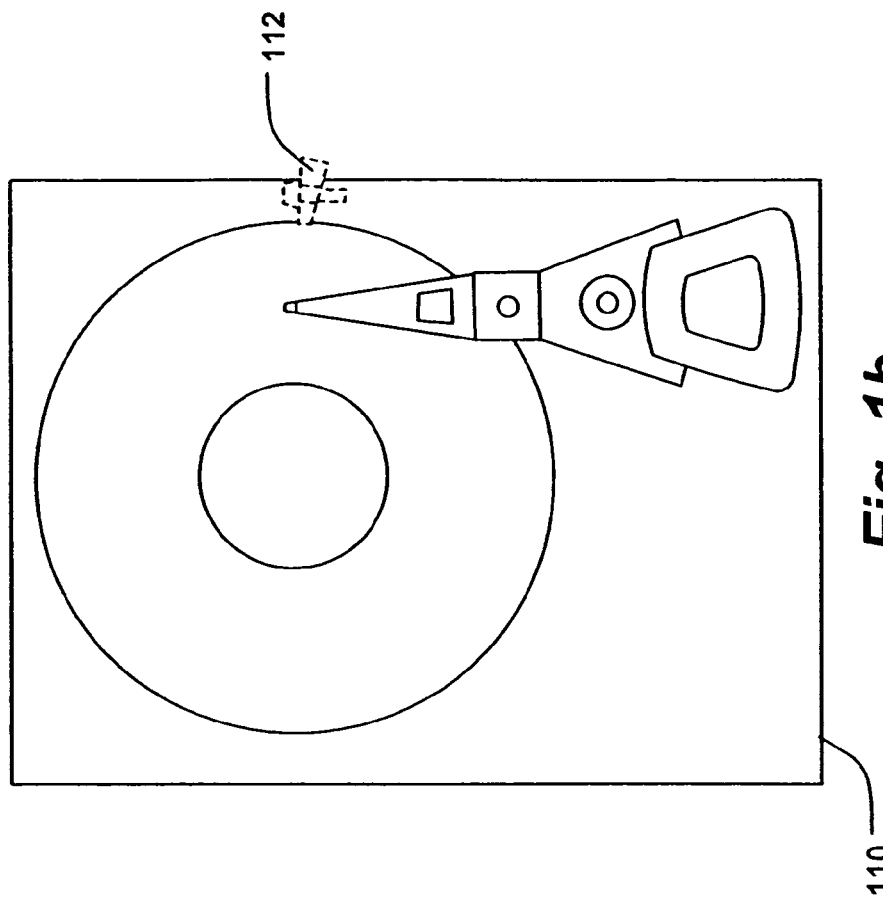
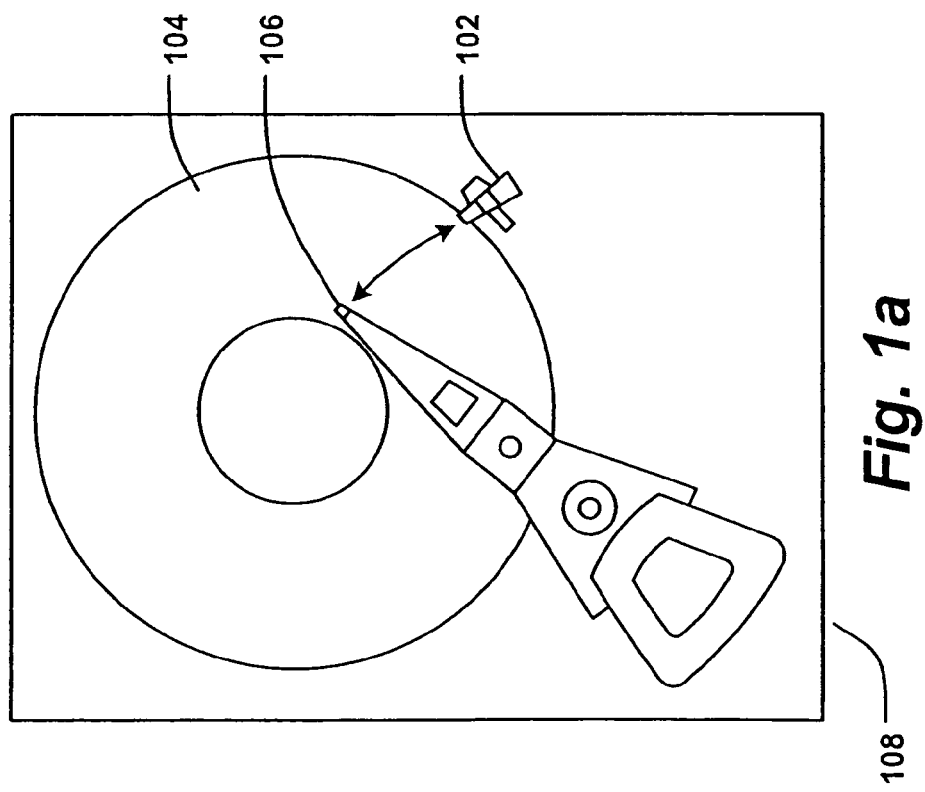
*Fig. 1a*
*Fig. 1b*

SYSTEM AND METHOD FOR DAMAGE PREVENTION BY IMPROVING THE SHOCK RESISTANCE OF A HARD DISK ACTUATOR ARM

RELATED APPLICATIONS

This application is a Divisional of patent application Ser. No. 10/289,908, filed on Nov. 6, 2002, now U.S. Pat. No. 7,142,396 which claims the benefit of priority to PCT/CN02/00391, filed on 05 Jun. 2002.

BACKGROUND INFORMATION

The present invention relates to magnetic hard disk drives. More specifically, the present invention relates to a system for damage prevention by improving the shock resistance of a hard disk actuator arm.

There are several types of computer data storage devices. One is a hard disk drive (HDD). The HDD utilizes one or more magnetic disks to store the data and one or more heads to read data from and write data to the disk(s). As advances have occurred in the art of hard drive and other computer technology, hard drives and their associated computer systems have become small enough to enable portability. Along with the portability of such systems, comes an increased risk of shock or vibration causing either impaired read/write ability or damage to the hard drive.

If a hard drive experiences severe vibration or mechanical shock, the actuator arm, which positions the head over the magnetic disk, may impact the disk, potentially damaging either the head or disk or both. In addition, damage may occur to components such as the arm suspension and physical and electrical connections. Further, if a micro-actuator system is utilized for fine-tuning of head placement, damage could occur to the micro-actuator itself. In the art today, different methods are utilized to prevent such damage.

FIG. 1 illustrates a typical method utilized to prevent damage caused by shock or vibration to a hard drive. A stationary ramp 102 is located near the outer edge of the disk 104. When the head 106 is moved beyond the edge of the disk, it rides onto the ramp 102, where it is 'parked' in a safe, restrained position. One problem with this design is that it is only effective during hard drive non-operation. It is unable to prevent damage during normal drive operation when the head 106 is reading data from and writing data to the disk 104. Further, a ramp 102 may only be used with 'diagonal arm orientation' hard drives 108, as shown in FIG. 1a. Because of space limitations, a ramp 112 may not be utilized with 'perpendicular arm orientation' hard drives 110, as shown in FIG. 1b.

FIG. 2 provides an illustration of another method of preventing shock/vibration-associated damage, which involves the utilization of a stationary 'comb'. As shown in FIGS. 2a (top view) and 2b (side view), the comb 206 is affixed to the hard drive casing 212 in a location such that each of the disks 202 and each of the arms 204 has a position interposed between 'teeth' 208 of the comb 206 throughout the arm's 204 range of motion (See FIG. 3, also).

FIG. 3 provides another illustration of the 'comb' method of arm stabilization. FIGS. 3a and 3b show the arms 304 at the opposite end of their range of motion 314. One disadvantage of the 'comb' method is that there is a substantial portion (the load beam 316) of the arm 304 that is unconstrained by the comb 306. This portion 316 of the arm is free to move toward and away from the disk 302 under vibration or mechanical shock in a 'spring-like' manner. Another disadvantage is that the comb 306 supports only the base plate portion 318 of the arm and not the suspension (load beam 316) of the head 320 (discussed below). Further, the distance from the support of the comb 306 to the head 320 is relatively large, allowing for substantial displacement of the head under shock/vibration. It is therefore desirable to have a system for improving the shock resistance of a hard drive actuator arm in addition to other advantages.

BRIEF DESCRIPTION OF THE DRAWINGS

FIG. 1 illustrates the 'ramp' method for preventing damage caused by shock or vibration to a hard drive.

DETAILED DESCRIPTION

Figures 2A, 2B:
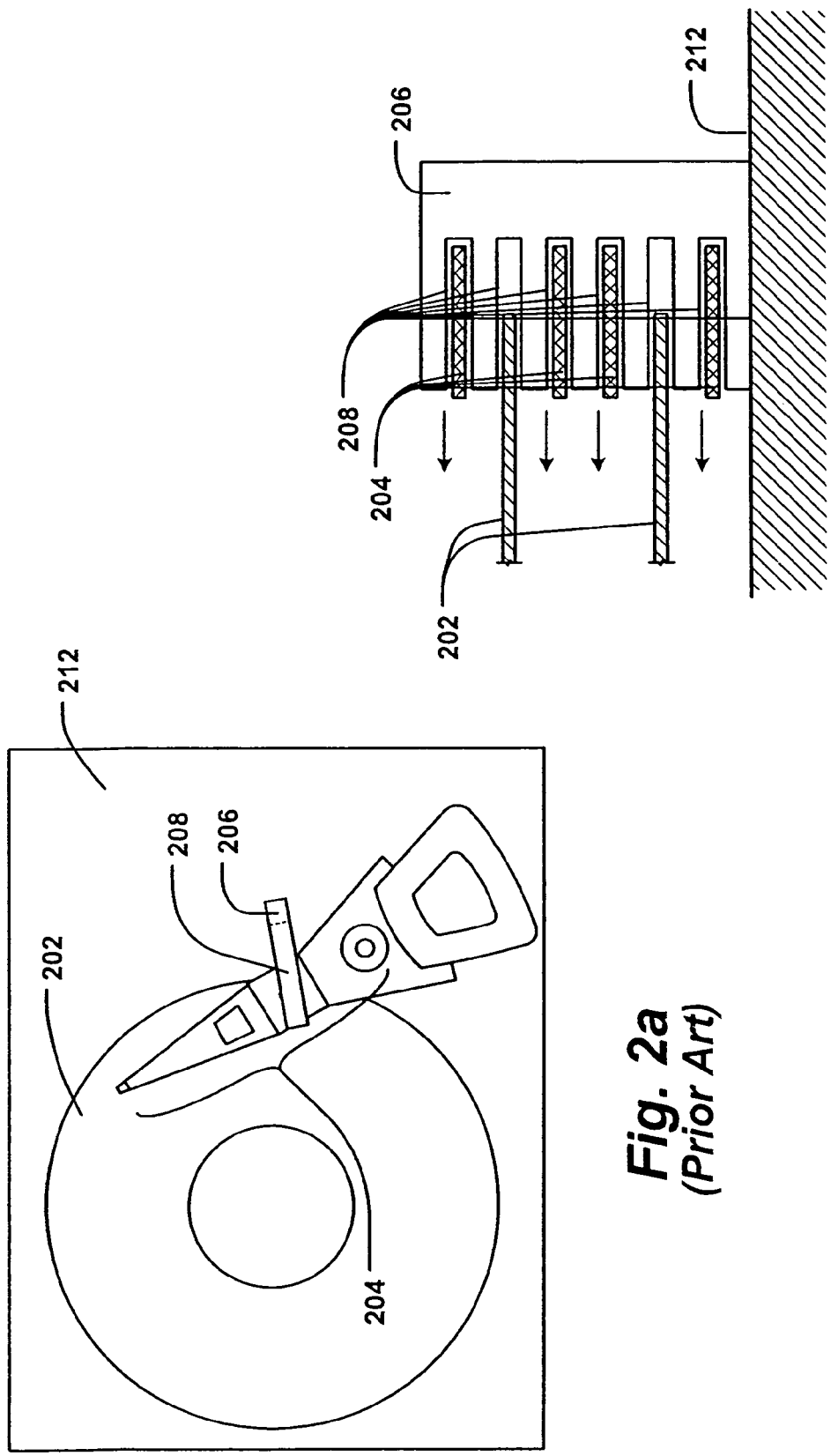
FIG. 2 provides an illustration of another method of preventing shock/vibration-associated damage, which involves the utilization of a stationary 'comb'.
Figure 3:
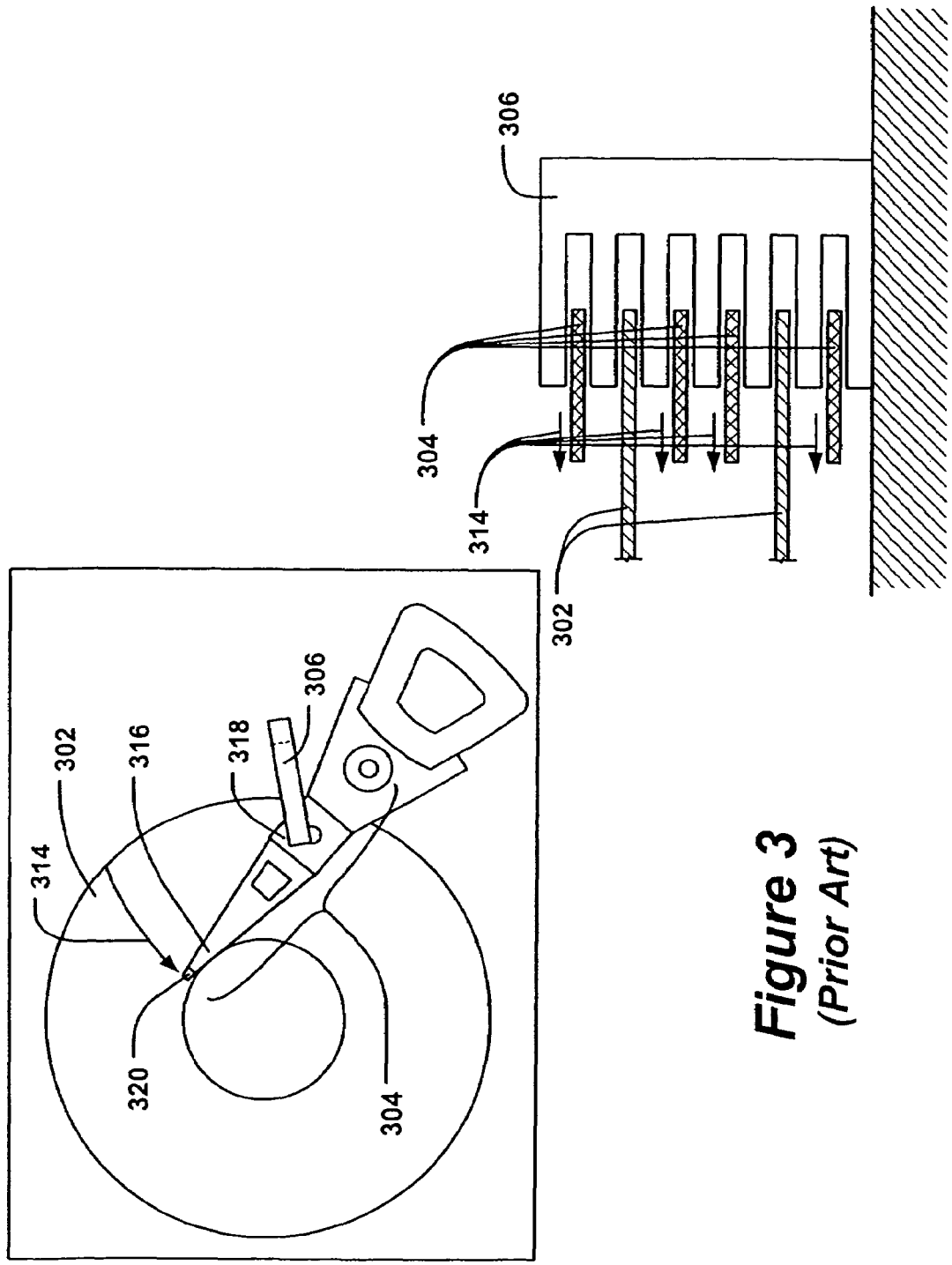
FIG. 3 provides another illustration of the 'comb' method of arm stabilization.
Figure 4B:
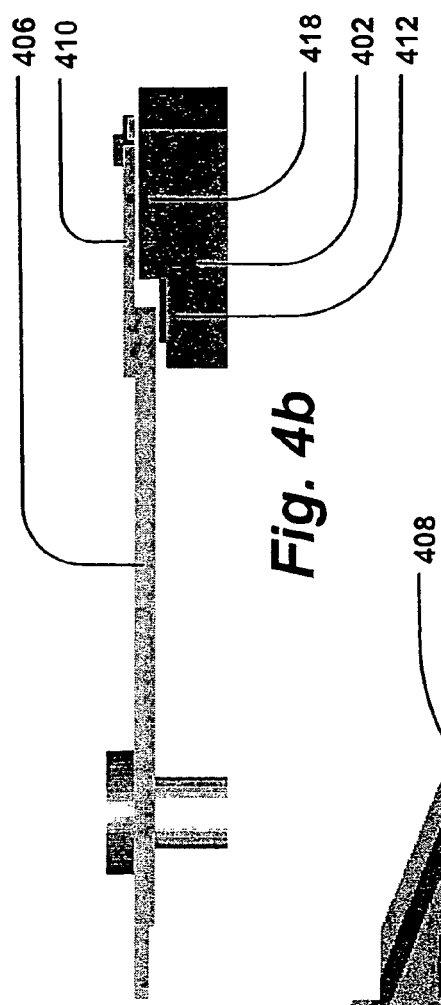
FIG. 4 illustrates a single-head hard drive utilizing an actuator arm guide block under principles of the present invention.
Figure 4A:
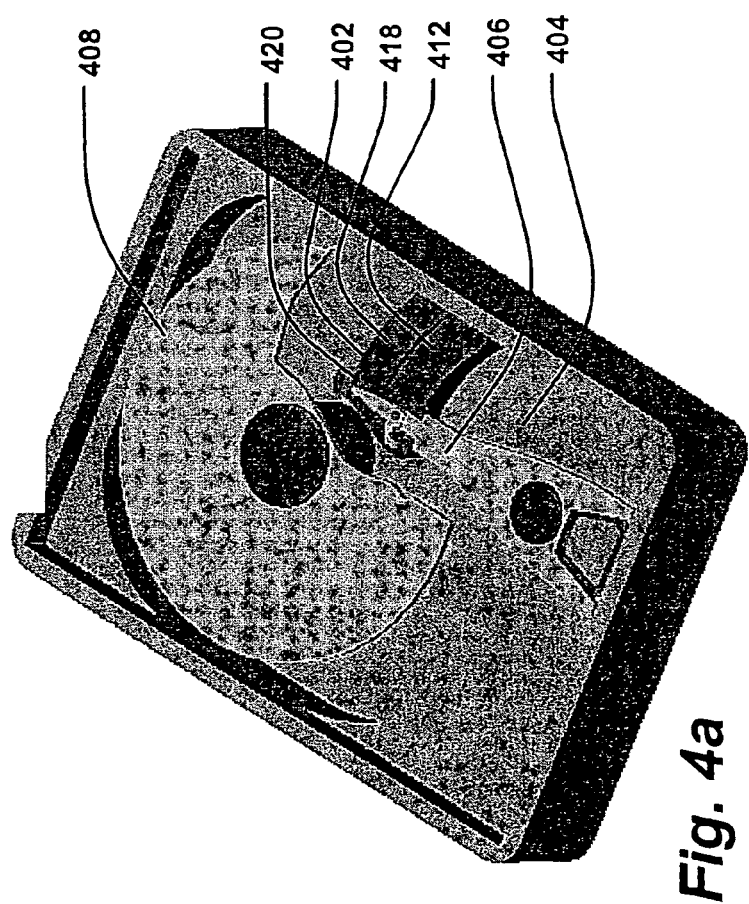

To improve shock resistance of the hard drive, in one embodiment of the present invention, a guide block is provided to support/restrain the actuator arm from behind (i.e., the side facing away from the surface of the disk). FIG. 4 illustrates a single-head hard drive utilizing an actuator arm guide block under principles of the present invention. FIG. 4a provides a perspective view of a hard drive with guide block, and FIG. 4b provides a side view of the actuator arm and guide block under principles of the present invention. In one embodiment, an 'arc'-shaped guide block 402 is coupled to the hard drive casing 404 behind the actuator arm 406 to prevent the arm 406 from flexing away from the disk 408 during shock or vibration. The arm 406 is thus not allowed to bend away (downward, in this illustration) from the disk 408, preventing damage to the arm (over-flexure) and/or disk (by impact upon return swing). In one embodiment, the guide block 402 is shaped to follow the path of the head suspension (load beam) 410 through the arm's 406 angular range of motion.

In one embodiment, the guide block 402 is made of a metal, such as stainless steel; in another embodiment, the guide block 402 is made of a polymer, such as polyethylene, polyester, or polyamide; and in another embodiment, the guide block 402 is ceramic.

In one embodiment, the guide block 402 has two different surfaces (steps). The first step 412 supports the main portion of the arm 406, and the second step 418 supports the load beam portion (suspension) 410. This design allows the load beam 410, which can articulate somewhat with respect to the main portion of the arm 406, to be supported independently. In one embodiment, a portion of the guide block 402 near the center of the disk 408 serves as a load/unload station 420 to constrain the arm 406 during non-operation of the hard drive.

Figure 5B:
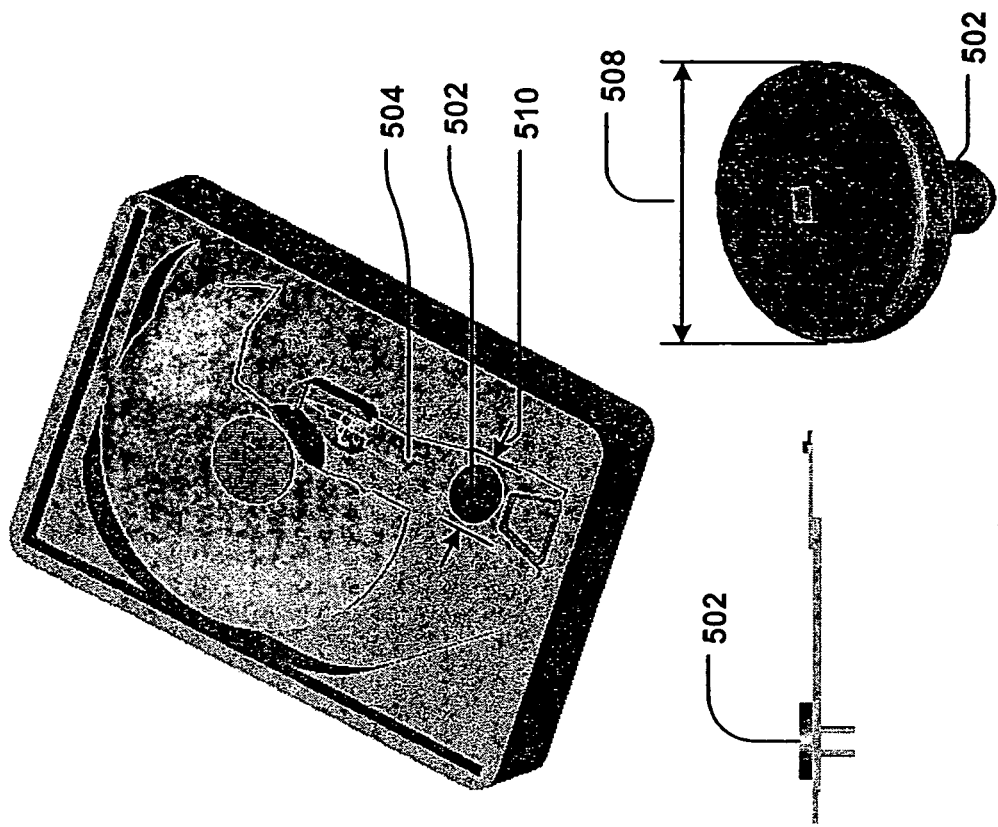
FIG. 5 illustrates increasing the diameter of the actuator screw under principles of the present invention.
Figure 5A:
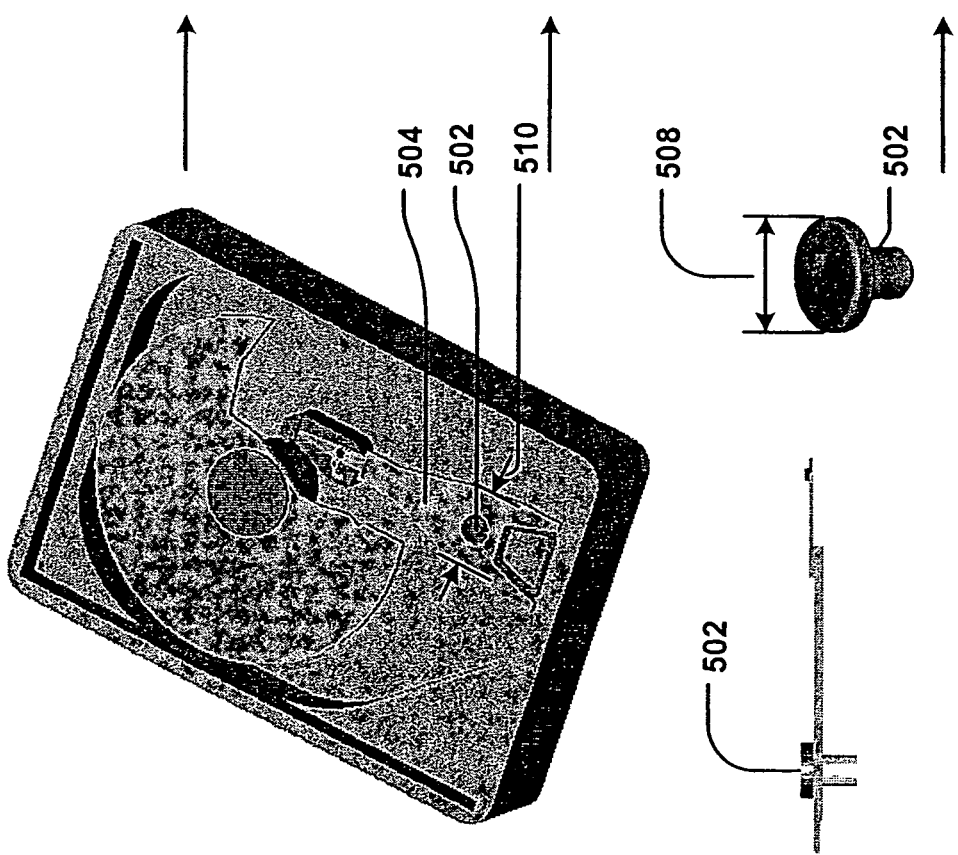

In one embodiment of the present invention, an actuator screw is utilized that has ahead (crown) large enough to reduce arm vibration. FIG. 5 illustrates increasing the diameter of the actuator screw 502 under principles of the present invention. Common in the art today is a screw head diameter of 5.3 millimeters (mm). In one embodiment, a screw with a larger-diameter head 502 provides axially-directed compression upon the arm over a greater area, thus reinforcing and stabilizing the arm 504 under that area. Further, it provides pressure farther away from the axis, giving a greater moment for resisting vibration/shock-induced flexure (torsion). In one embodiment, an actuator screw 502 with a head diameter of 8.4 millimeter (mm) is utilized with a 3.0 inch hard drive. In one embodiment, an 8.4 mm screw head 502 is utilized with a 3.5 inch hard drive. Preferably, in 3.5 inch hard drives, the head diameter of the screw is between 8.4 mm and 9.4 mm to achieve the vibration/shock resistance of the present invention. In another embodiment, a generally 8.4 mm head diameter screw 502 is utilized to provide the benefits of a large-headed screw 502, yet satisfy space limitations of a 3.5 inch hard drive such as the Maxtor Nike 3.5 inch drive. This provides a screw head diameter 508 that is 44.9% the width 510 of the arm (at the midpoint of the screw and perpendicular to the length of the arm 504) for a hard drive such as the Maxtor Nike 3.5 inch platform, which has an arm width 510 of 18.7 mm. Preferably, in 3.5 inch hard drives, the ratio between head diameter and arm width is between 28.3% and 50.3% to achieve the vibration/shock resistance of the present invention.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system to improve shock resistance of a magnetic storage device comprising:
    an actuator screw to secure an arm element and to provide an axis of rotation for said arm element, wherein
    said actuator screw includes a crown portion of a diameter and a shaft portion;
    said crown portion is in direct contact with a surface of the arm element so as to secure said arm element by uniformly applying axially-imposed compression upon the arm element; and
    said diameter is between 28.3% and 50.3% of a width of said arm element, said width taken midpoint of said actuator screw and perpendicular to said arm element.

2. The system of claim 1, wherein the actuator screw is to be secured to a threaded receptor.

3. The system of claim 1, wherein the actuator screw is to secure said arm element to a storage device casing.

4. A method to improve shock resistance of a magnetic storage device comprising:
    providing, by an actuator screw, an axis of rotation for said arm element, said actuator screw including a crown portion of a diameter and a shaft portion; and
    securing, by said actuator screw, an arm element via axially-imposed compression of said crown portion upon said arm element, wherein
    said diameter is greater than 5.3 millimeters but does not exceed 9.4 millimeters so as to minimize vibration of said arm element.

5. The method of claim 4, wherein the actuator screw is to be secured to a threaded receptor.

6. The method of claim 4, wherein the actuator screw is to secure said arm element to a storage device casing.

7. A system to improve shock resistance of a magnetic storage device comprising:
    an actuator screw to secure an arm element and to provide an axis of rotation for said arm element, wherein
    said actuator screw includes a crown portion of a diameter and a shaft portion;
    said crown portion is in direct contact with a surface of the arm element so as to secure said arm element by uniformly applying axially-imposed compression upon the arm element; and
    said diameter is between 8.4 millimeters and 9.4 millimeters.

8. A system to improve shock resistance of a magnetic storage device comprising:
    an actuator screw to secure an arm element and to provide an axis of rotation for said arm element, wherein
    said actuator screw includes a crown portion of a diameter and a shaft portion;
    said crown portion is in direct contact with a surface of the arm element so as to secure said arm element by uniformly applying axially-imposed compression upon the arm; and
    said diameter is greater than 5.3 millimeters but does not exceed 9.4 millimeters.

* * * * *